United States Patent [19]
Yates

[11] 3,802,419
[45] Apr. 9, 1974

[54] RESPIRATION MONITOR

[75] Inventor: John W. Yates, Bedford, Mass.

[73] Assignee: The United States of America as represented by the Secretary of the Air Force, Washington, D.C.

[22] Filed: Apr. 11, 1972

[21] Appl. No.: 242,998

[52] U.S. Cl............................ 128/2.1 R, 128/2.1 Z
[51] Int. Cl.............................................. A61b 5/05
[58] Field of Search........... 128/2.1 R, 2.1 Z, 2.05 V

[56] References Cited
UNITED STATES PATENTS

| | | | |
|---|---|---|---|
| 3,347,223 | 10/1967 | Pacela............................. | 128/2.1 Z |
| 3,452,743 | 7/1969 | Rieke............................... | 128/2.1 Z |
| 3,608,542 | 9/1971 | Pacela et al...................... | 128/2.1 Z |
| 3,524,058 | 8/1970 | Robertson et al................ | 128/2.1 Z |
| 3,587,562 | 6/1971 | Williams.......................... | 128/2.1 Z |
| 3,556,083 | 1/1971 | Grichnik et al.................. | 128/2.1 Z |
| 3,545,429 | 12/1970 | Pelta et al....................... | 128/2.1 Z |

OTHER PUBLICATIONS

N.A.S.A. Tech. Brief No. 68-10220, June, 1968.
Amer. Journ. of Med. Electronics, 1964, Apr.-June, pp. 101-104.

Primary Examiner—Kyle L. Howell

[57] ABSTRACT

Respiration is monitored by measuring a subject's impedance by impressing an oscillator-controlled constant current source upon the subject. The output is fed to a differential amplifier, bandpass filtered, and full wave rectified. The differential amplifier can be switched to be fed by separate electrodes on the subject and not connected to the constant current source.

6 Claims, 6 Drawing Figures

NORMAL

INHALE AND HOLD

NORMAL

INHALE AND HOLD

RESPIRATION MONITOR

BACKGROUND OF THE INVENTION

This invention relates to respiration, and more particularly to a constant current plethysmograph. The two basic impedance measuring systems used in the past are the bridge circuit and the constant current circuit.

The bridge circuit was previously to study the effects of artifacts on the impedance signal. Although the impedance signal could be compared with tidal volume in the presence of noise artifacts, this result has to be obtained by special analog and digital procedures. The bridge circuit has two limitations that make it impractical for the dynamic requirements of a space environment. Constant balancing is required to keep the system operating around the null position, and the bridge circuit becomes nonlinear as the distance from null increases. Both of these problems become very serious because of the large impedance changes due to a change in body position.

The system, using a constant current source, has basic features which are ideal for body impedance measurements. The first of these features is the linear relationship between voltage and resistance for a current that remains constant. The second feature is that the linear relationship exists over a large tunable impedance range. Thus the two limitations encountered in the bridge circuit are overcome. Another feature of the constant current system is that the impedance change can be measured independently of the basal body impedance.

The different constant current systems have been used in the past for many body impedance studies. The first system used by many investigators consisted of a constant current source as the exciter and a bridge circuit as the monitor. Although a constant current source is used, the basic problems of the bridge circuit are encountered in this arrangement. The second system, places a large resistor in series with the signal source. This resistor is very large compared with the subjects's body impedance making the current through the body approximately constant. Although small, a change in current through the body does occur when the basal body impedance changes. In many cases, the change in basal body impedance is greater than the impedance change due to respiration and it then becomes impossible to differentiate between the two.

Modern operational amplifier technology has made it possible to approximate a constant current source to a much greater degree than previously used. The present invention offers a new impedance plethysmograph based on the improved constant current method.

SUMMARY OF THE INVENTION

The impedance plethysmograph is a device that measures the change in thoracic impedance due to a change in respiratory volume. The theory employed in this invention requires that a constant current be passed through the subject, resulting in a voltage change that is linearly related to the change in impedance. These voltages are picked up by an ultra high input impedance differential amplifier and converted to a single ended signal. This voltage is passed through an 80K-100K Hz band-pass filter to eliminate stray signals not related to the carrier frequency. The filtered signal is then passed through a full wave rectifier and hold circuit resulting in a signal that is predominately a DC voltage. The DC voltage contains a component voltage proportional to the basic body impedance, and a component proportional to small impedance changes resulting from changes in lung volume. That portion of the signal, representing the basic body impedance level, is amplified by a low gain amplifier and simultaneously sent to a meter and strip chart output connection. The remaining component of the signal, that which is proportional to the impedance change, is passed through a high gain amplifier to a strip chart output. A voltage offset network is included in the high gain amplifier to allow for adjusting the center scale on recording devices. This circuit makes use of the low frequency response of strip chart recorders to eliminate the unwanted frequencies over 100 Hz. The sensitivity of this device is sufficient to show a 1 ohm change over a basic body impedance level between 40 ohms and 15K ohms. In addition the subject is floating, thereby eliminating many ground artifacts that plague other measuring systems. Several features have been included in this plethysmograph to make it useful in research applications. The circuit contains an internal oscillator operating a 100K Hz and an ability to accept an external oscillator for operation at various other frequencies. This device is capable of using either a bipolar or tetrapolar electrode configuration for making body impedance measurements. Test points have been included in this device to insure that the entire system is operating correctly and is properly aligned. Safety features have been included to protect the subject and equipment.

It is therefore an object of the invention to provide a novel and improved plethysmograph.

It is another object to provide an impedance plethysmograph that can measure over a large impedance range which would include the basal impedance level and the minute impedance change from respiration.

It is another object to provide an impedance plethysmograph that can simultaneously measure respiratory impedance levels.

It is still another object to provide an impedance plethysmograph that is safe for the subject being monitored.

These and other objects, features and advantages of the invention will become more apparent from the following description taken in accompaniment with the illustrative embodiment in the accompanying drawings.

DETAILED DESCRIPTION OF THE PREFERRED EMBODIMENT

Figure 1:
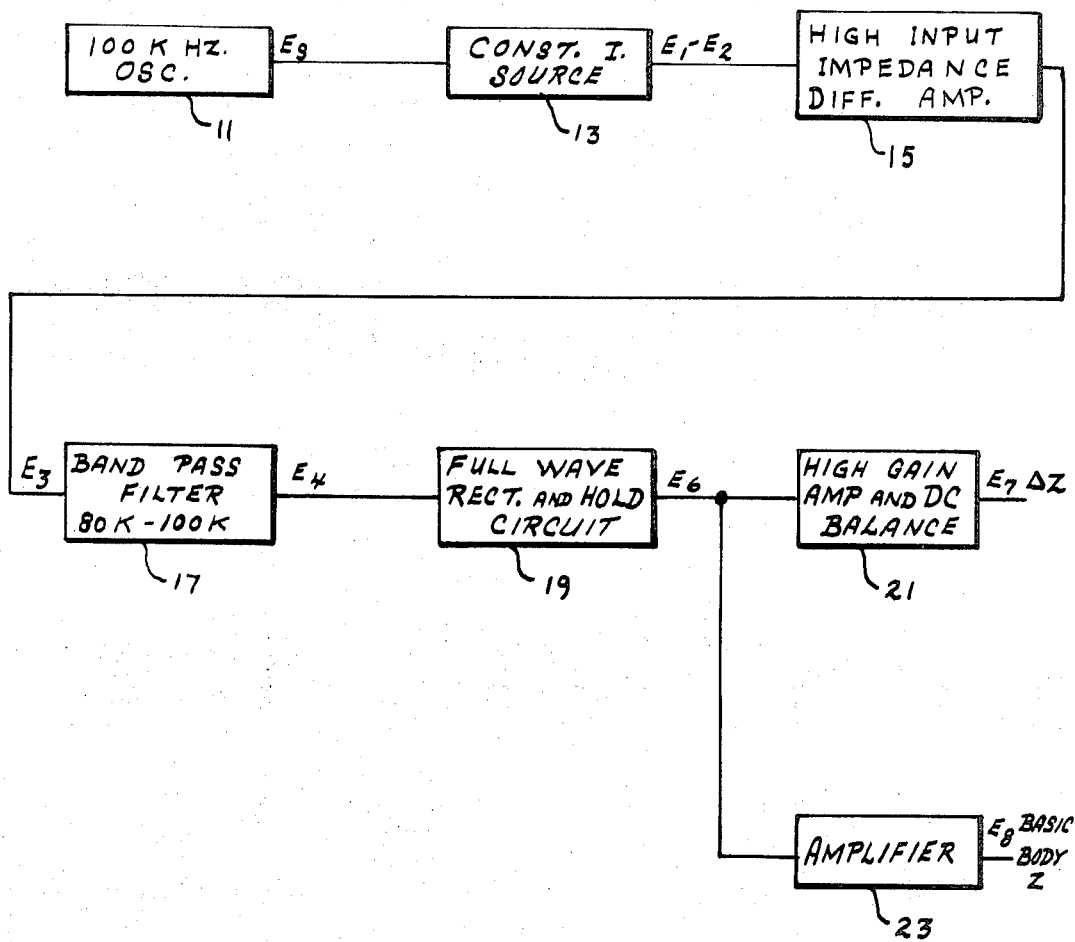
FIG. 1 shows a block diagram of the embodiment of the invention.

The block diagram of the impedance plethysmograph shown in FIG. 1 in which 100 KHz oscillator 11 is used as the main signal source and its voltage $E_s$ is fed into constant current source 13 resulting in 100 KHz constant current that can be supplied to the body. High input impedance differential amplifier 15 is used to measure the change in voltage $E_1-E_2$ at the body. The voltage is converted into a single ended signal $E_3$ and sent to bandpass filter 17 which eliminates any extraneous signals not related to the 100 KHz carrier. The filtered signal $E_4$ is then converted to a DC signal designated as $E_6$ using full wave rectifier and hold circuit 19. The DC voltage is then simultaneously sent to high gain amplifier 21 with DC balance and additional low gain amplifier 23. The high gain amplifier amplifies very small voltages due to minute impedance changes to produce a useable signal proportional to the thoracic volume change. Low gain amplifier amplifies the signal proportional to the basal body impedance.

Figure 2:
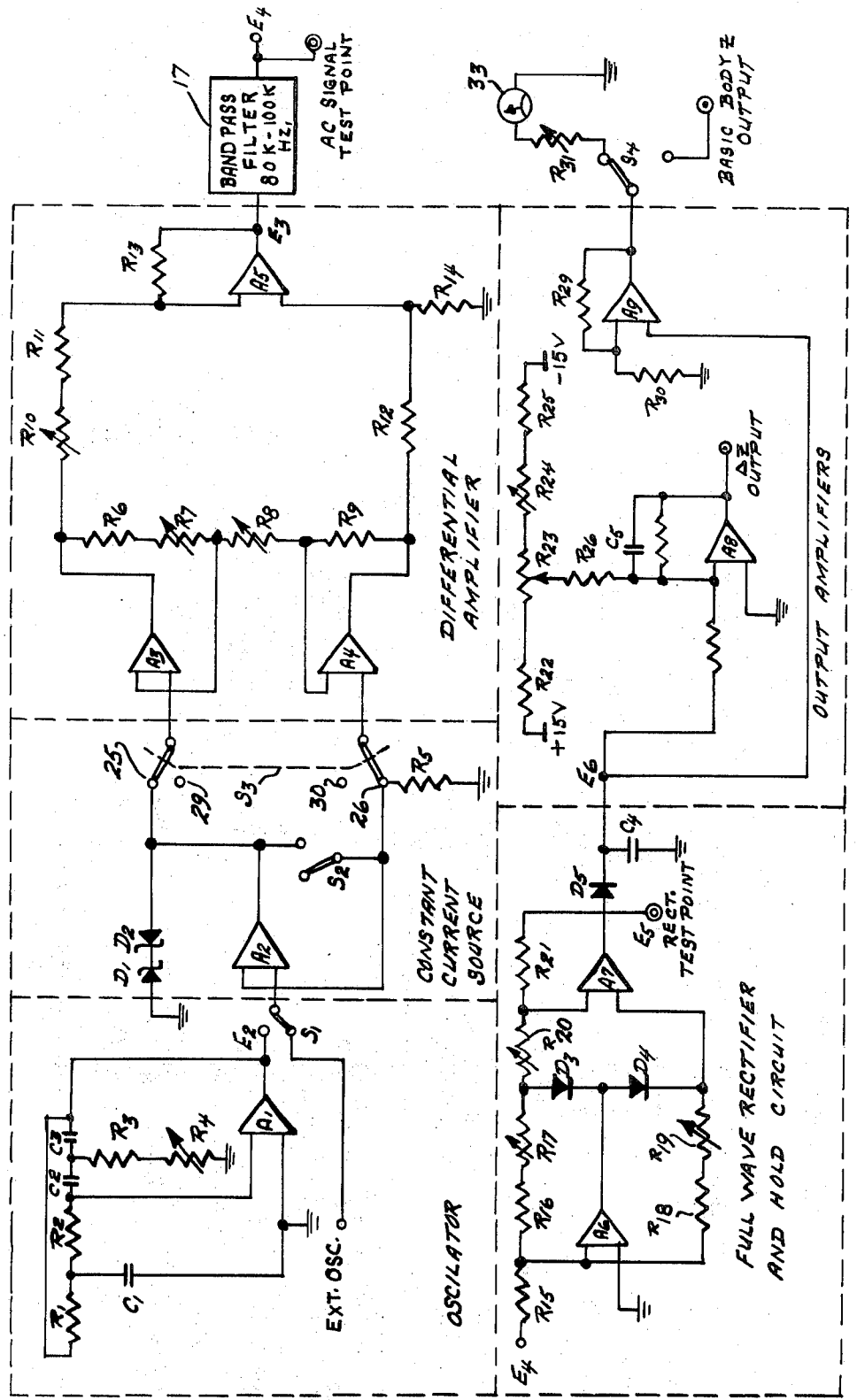
FIG. 2 is a detail of that shown in FIG. 1.

Referring to FIG. 2, the oscillator circuit is a double integrator with regenerative feedback using amplifier $A_1$ and feedback through capacitors $C_1$, $C_2$ and $C_3$ and resistors $R_1$, $R_2$, $R_3$ and $R_4$ with $R_4$ being a variable resistor. The frequency of oscillation is determined by $$f = (1/2\pi R_1 C_2)$$

$R_4$ is adjusted to the point where the circuit just begins to oscillate. An external oscillator can be used as an alternative by using a switch $S_1$.

A constant current source is needed to measure thoracic impedance in accordance with Ohm's law $E = IZ$. Since the voltage being measured is a function of the current through the body and the impedance across the body, a change in either of these parameters will cause a voltage change. Therefore, by keeping current constant, the voltage change is directly proportional to an impedance change.

The inherent properties of an operational amplifier, namely, an effective zero voltage between amplifier inputs and zero input current to both amplifier inputs form the basis for the constant current source. Since only minute currents flow through the negative input of amplifier $A_2$, the current through resistor $R_5$ is equal to the current through the load. Since the voltage between amplifier inputs is approximately zero, the voltage across resistor $R_5$ is equal to the oscillator voltage. Therefore the current through the load, in this case the body, is determined by $$I = (E_s/R_5)$$

where $E_s$ is the oscillators's voltage. One factor, necessary for the proper operation of the current source, is the ability of the oscillator to maintain a constant voltage output. Since no current flows into the positive input of the constant current source, the oscillator is not loaded and, therefore, produces a constant voltage regardless of body impedance.

The constant current source for this impedance plethysmograph is basically an operational amplifier connected in the non-inverting configuration. The output voltage $E_1$ is given by $$E_1 = E_s (R_L + R_5/R_5).$$

Since the negative input voltage $E_2$ equals the oscillator voltage $E_s$ the voltage across the load $E_1 - E_2$ is given by $$E_1 - E_2 = E_s (R_L/R_5).$$

Therefore, the voltage measured across the load is linearly related to the impedance of the load.

This linear relationship is somewhat restricted by the electrical specifications of the operational amplifier. Since the maximum allowable output voltage is approximately ± 10 volts, the maximum load (body impedance) cannot be greater than approximately 36.5 K ohms before saturation occurs. The minimum load required for linear operation is determined by the common-mode rejection of the amplifier, the input voltage offset, and the input current bias. A value of approximately 100 ohms has been measured as the lower limit of acceptable body impedance. A past study has shown that the actual body impedance is well within the limits of this constant current source.

A test on the constant current source used in the final design has shown that for a load impedance varying from 40 ohms to 75 K ohms there was a constant current of 0.125 ma ± 10 percent. The variance in the current only occurs at the extremes of the impedance range. In order to protect the constant current amplifier stages when the circuit is not attached to any subject, a short circuit switch $S_2$ is connected across the load. This prevents any of the amplifiers from saturating when there is an open circuit in the feedback loop of the constant current source (i.e., when no measurements are being taken).

In order to protect the subject, two 6.80 volt Zener diodes $D_1$ and $D_2$ are placed in the feedback loop of the constant current source. Thus, in the event that either of the first two amplifiers saturate, only 6.80 volts will appear across the subject and results in a maximum current of only 0.34 milliamp through the subject.

An additional safety feature results from the subject not being connected to ground. As a consequence there is no common point in the chest area that could attract current from outside sources.

The impedance plethysmograph can accept both bipolar and tetrapolar systems. The choice of these systems is made by switch $S_3$. In the bipolar position of $S_3$ current is supplied through the outer pair of electrodes 25 and 26. The changes to be measured are also picked up by the same pair of electrodes. In the tetrapolar position of $S_3$ current is supplied through the same outer pair of electrodes 25 and 26 as used for the bipolar system. However, the signal to be measured is picked up from the inner pair of electrodes 29 and 30.

In order for the voltage across the body $E_1$ and $E_2$ to be a true measurement of body impedance, there can be no loading by the recording amplifier. In order to prevent loading, ultra high input impedance is needed in the recording amplifier. In addition, since the subject is not grounded, a differential input amplifier is needed. The use of two operational amplifiers, $A_3$ and $A_4$, which can be a Burr-Brown 3307, connected in the non-inverting configuration with cross coupling, solves both of these problems. Associated circuitry includes fixed resistors $R_6$, $R_9$, and variable resistors $R_7$ and $R_8$. The typical input impedance of this high impedance differential amplifier is $10^{11}$ ohms at each input. The gain of this amplifier is given by $A = 1 + [(R_6 + R_7/R_8) + (R_9/R_8)]$ The cross coupling used in this configuration improves the common-mode response of the amplifier considerably. The differential voltage $E_1 - E_2$ is amplified with a gain of 1.

In order to optimize the common mode rejection it is necessary to match the gain of the amplifiers as closely as possible. Potentiometer $R_7$ is used to balance the gain of these two amplifiers. To some extent this resistor can also be used to compensate for differences in the operational amplifiers themselves.

The changes of impedance at the electrode-skin interface of the recording electrodes are another reason for having high impedance at the amplifier inputs. These changes, ranging from a few ohms for drying of the electrode paste to several thousand ohms due to a direct pressure caused by tape or clothing, can be represented as resistances in series with the input impedance of the amplifier. The high input impedance of the amplifier ($10^{11}$ ohms) will completely mask the typical impedance changes at the electrode-skin interface. However, even this very high input impedance will not eliminate the effect of a large pressure (such as tapping) on the electrode.

Amplifier $A_5$ with input fixed resistors $R_{11}$ and $R_{12}$ and variable resistor $R_{10}$ is used to convert the differential signal to a single ended signal. The gain for this stage, if $R_{13} = R_{14}$ and $R_{12} = R_{10} + R_{11}$ is given by $$A = -(R_{13}/R_{12}).$$

Variable resistor $R_{10}$ is used to balance the gain at each input of the amplifier. This resistor makes the final adjustment to insure a properly balanced signal.

Bandpass filter 17 used in this system can be a Dytronics Model 723 filter, and is used to eliminate any stray signals other than the 100 KHz signal necessary for the impedance measurement eliminating such effects as that deriving from an electrocardiogram.

The full wave rectifier and hold circuit is used to convert the 100 KHz signal to a DC voltage proportional to the impedance of the body and with this transformation strip chart recorders can be used. This circuit includes amplifiers $A_6$ and $A_7$, fixed resistors $R_{15}$, $R_{16}$, $R_{18}$, and $R_{21}$, variable resistors $R_{17}$, $R_{19}$, $R_{20}$, diodes $D_3$, $D_4$, $D_5$ and capacitor $C_4$.

This full wave rectifier has many advantages over standard rectifier circuits. The input voltage $E_4$ only drives one amplifier instead of two amplifiers in parallel. The negative going currents are not eliminated by a bucking current; thus, the amplifier does not have to supply as much current. Also, more than one signal can be connected to the input of the rectifier, if necessary.

In order to understand the operation of this circuit it is necessary to study the effects of a positive and negative input signal $E_4$. As $E_4$ goes positive the signal through amplifier $A_6$ becomes negative and diode $D_3$ conducts. Thus for a positive going signal two inverting amplifiers are connected in series, and the gain for a positive going signal is $$(E_5/E_4) = [R_{16} + R_{17}/R_{15}] [R_{21}/R_{20}].$$

For negative going input voltages the signal is also inverted through amplifier $A_6$. Diode $D_4$ conducts in this situation. Thus, there is a feedback loop from the output of each amplifier to the negative input of amplifier $A_6$, and the gain for a negative going signal is $$(E_5/E_4) = [(R_{18} + R_{19})(R_{16} + R_{17} + R_{20} + R_{21})/R_{15}(R_{18} + R_{19} + R_{16} + R_{17} + R_{20})]$$

Although in theory perfect unity gain can be achieved by using the same value resistors, this in fact could not be obtained because of differences in the amplifiers and individual components. Variable resistors $R_{17}$ and $R_{19}$ are used to correct for component differences in $R_{16}$ and $R_{18}$, respectively, and slight differences in the way the amplifier, $A_6$, handles positive and negative signals in the first stage of the rectifier circuit. Since $(R_{16} + R_{17})$ does not equal $(R_{18} + R_{19})$ when the first stage is adjusted, a second variable resistor, $R_{20}$, is used to compensate for this difference. A 20K ohm variable resistor is used instead of a 10K ohm fixed resistor to insure a balanced, fully rectified signal with unity gain.

Capacitor $C_4$ and the input impedance of the next stage make up the holding portion of this circuit. The time constant is sufficiently long to permit a ripple of less than 20 percent. Diode $D_5$ is needed to prevent the amplifier output voltage from bucking the capacitor voltage after the first cycle.

The voltage $E_6$ represents two signals. One signal is proportional to the basal body impedance and the other is proportional to the changes in thoracic impedance. Since these thoracic impedance changes are very small, a very high gain amplifier $A_8$ is needed to measure these changes with reasonable accuracy. However, that portion of the DC voltage $E_6$ representing the basal body impedance is also amplified. This portion of the signal is large enough to cause saturation in amplifier $A_8$.

In order to eliminate this problem, a bucking voltage controlled by resistors $R_{22}$ to $R_{26}$ inclusive was added to the circuit. By adjusting the coarse adjustment by potentiometer $R_{23}$ and then the fine adjustment by variable resistor $R_{24}$ the output can be set at zero volts DC. With the bucking voltage added the small changes of impedance due to respiratory motion can be measured. A typical output would be a four volt change for a 10 ohm change. Capacitor $C_5$ in the feedback loop eliminates any stray high frequency components over 50 Hz.

Besides measuring impedance change, it is also desirable to be able to measure the basal body impedance of the subject. For this reason amplifier $A_9$ with resistors $R_{29}$ and $R_{30}$ and milliameter 33 are included in the design. The DC voltage $E_6$ is amplified two times in the non-inverting amplifier $A_9$ and then passed through a milliameter or a strip chart recorder. Since 1,700 ohms is the midrange of expected impedance for a transthoracic measurement, this value is set as midscale on the meter. This meter can indicate the basal body impedance between 1,100 ohms and 2,300 ohms, when 1,700 ohms is the center reading. The entire impedance measuring range of the meter is easily altered by potentiometer $R_{31}$ to produce ranges between 40 ohms and 15 K ohms.

FIGS. 3a to 3d show the results obtained from the plethysmograph compared to that obtained using a spirometer. In each of the figures, the upper graphs 41 to 44 are the results from a spirometer and the amplitudes represent changes in volume. The lower graphs 45 to 48 are the results from the plethysmograph and the amplitudes represent changes in impedances.

Figure 3A:
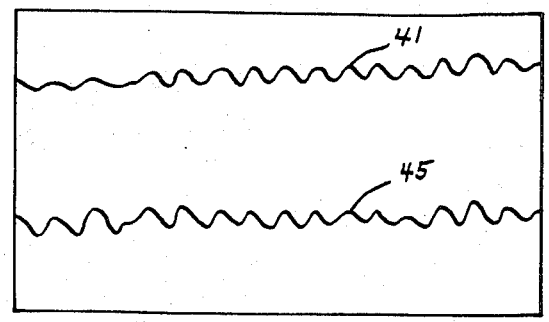
FIGS. 3a through 3d show the graphs obtained from the use of an impedance plethysmograph as compared with a spirometer.
Figure 3B:
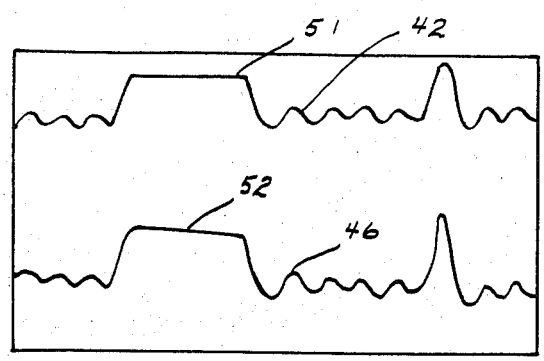
Figure 3C:
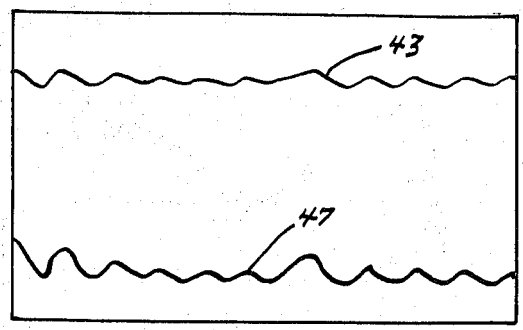
Figure 3D:
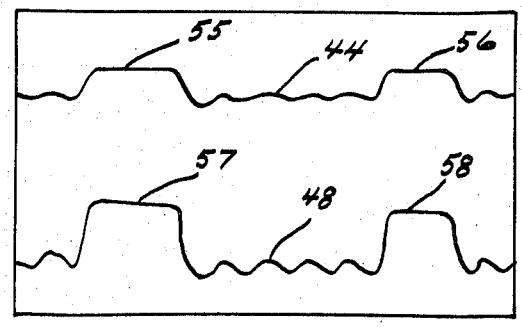

FIG. 3a shows normal respiration using the two electrode system while FIG. 3b also using the two electrode system shows the results when the subject inhales and holds. This is particularly represented by that part of the curves designated as 51 and 52. In the four electrode system, FIG. 3c shows normal respiration while FIG. 3d shows the results when the subject inhales and holds particularly represented by portions of the curve designated as 55 to 58.

What is claimed is:

1. A system for monitoring the respiration of a subject having a basic body impedance and a changing thoracic impedance comprising:

a. an internal oscillator circuit;
b. a constant current source controlled by the oscillator;
c. a first pair of electrodes fed by the constant current source and adapted to be placed in contact with the subject;
d. a differential amplifier connected to the electrodes for measuring the potential difference therebetween;
e. a band-pass filter fed by the differential amplifier;
f. a full wave rectifier fed by the band-pass filter, the rectified output being a signal proportional to the basic body impedance and a signal proportional to the thoracic impedance change, the rectifier including:
  1. first amplifier fed by the band-pass filter,
  2. first and second resistors connected to the input terminal of the first amplifier,
  3. a first diode having an anode connected to the first resistor and the cathode connected to the output of the first amplifier,
  4. a second diode having an anode connected to the output of the first amplifier and the cathode connected to the second resistor,
  5. a second amplifier having first and second inputs, the first input being connected to the cathode of the second diode, and
  6. a third resistor interposed between the anode of the first diode and the second input of the second amplifier;
g. means for measuring the signal proportional to the basic body impedance level fed by the rectifier; and
h. means for measuring the signal proportional to the thoracic impedance change fed by the rectifier.

2. A respiration monitoring system according to claim 1 which further comprises:
  a. a second pair of electrodes connected to the subject; and
  b. means for switching the input to the differential amplifier from the first pair of electrodes to the second pair of electrodes.

3. A respiration monitoring system according to claim 2 which further comprises a grounded pair of series connected Zener diodes in opposite polarity and connected to the output of the constant current source.

4. A respiration monitoring system according to claim 2 which further comprises:
  a. a high gain amplifier interposed between the rectifier and the basic body impedance measuring means; and
  b. a low gain amplifier interposed between the rectifier and the thoracic impedance measuring means.

5. A respiration monitoring system according to claim 3 which further comprises:
  a. a terminal for external oscillator connection; and
  b. means for switching the input of the constant current source from the internal oscillator to the terminal for external oscillator connection.

6. A respiration monitoring system according to claim 4 which further comprises interposed between the rectifier and the high and low gain amplifiers:
  a. a grounded holding capacitor; and
  b. a holding diode having a cathode connected to the holding capacitor for retarding holding capacitor leakage.

* * * * *